(12) United States Patent
Lee

(10) Patent No.: US 9,871,903 B2
(45) Date of Patent: Jan. 16, 2018

(54) MOBILE COMPUTING TERMINAL WITH MORE THAN ONE LOCK SCREEN AND METHOD OF USING THE SAME

(71) Applicant: Moon Sang Lee, Daejeon (KR)

(72) Inventor: Moon Sang Lee, Daejeon (KR)

(*) Notice: Subject to any disclaimer, the term of this patent is extended or adjusted under 35 U.S.C. 154(b) by 0 days.

(21) Appl. No.: 15/182,493

(22) Filed: Jun. 14, 2016

(65) Prior Publication Data

US 2017/0034328 A1 Feb. 2, 2017

Related U.S. Application Data

(63) Continuation of application No. 14/399,937, filed as application No. PCT/KR2013/001292 on Feb. 19, 2013, now Pat. No. 9,398,142.

(30) Foreign Application Priority Data

May 7, 2012 (KR) .................. 10-2012-0048312

(51) Int. Cl.
*H04M 1/673* (2006.01)
*H04M 1/725* (2006.01)
(Continued)

(52) U.S. Cl.
CPC ........ *H04M 1/673* (2013.01); *G06F 3/04883* (2013.01); *G06Q 30/0241* (2013.01);
(Continued)

(58) Field of Classification Search
CPC ....... H04B 1/40; G06F 3/045; G06F 3/04883; G06F 3/0488; G06F 3/04886; H04M 1/67;
(Continued)

(56) References Cited

U.S. PATENT DOCUMENTS 8,571,521 B2 10/2013 Kim et al.
8,749,516 B2 * 6/2014 Kim ...................... G06F 1/1643
345/174

(Continued)

FOREIGN PATENT DOCUMENTS

KR 10-2010-0022509 A 3/2010
KR 10-2010-0057461 A 5/2010
(Continued)

OTHER PUBLICATIONS

International Search Report dated Jun. 17, 2013 of PCT/KR2013/001292 which is the parent application and its English translation in 4 pages.

(Continued)

*Primary Examiner* — Charles Appiah
*Assistant Examiner* — Margaret G Mastrodonato
(74) *Attorney, Agent, or Firm* — Knobbe Martens Olson & Bear LLP

(57) ABSTRACT

A method and a system for displaying information and content in a lock screen system having a plurality of screens so as to provide a screen lock for preventing an unintended input of a user terminal device, and a computer-readable recording medium. The method includes setting information and content on a plurality of lock screen, displaying the plurality of lock screens, providing a screen movement between the plurality of lock screens, executing an existing external application so as to provide detailed information for the information and content displayed on the plurality of lock screens, unlocking the plurality of lock screens, and posting an advertisement on a part of the plurality of lock screens. Users can easily confirm simple information and content and use the as a new medium and means for expressing themselves by setting the lock screen windows according to the personalities of the users.

19 Claims, 12 Drawing Sheets

(51) Int. Cl.
*G06F 3/0488* (2013.01)
*G06Q 30/02* (2012.01)
*H04M 1/667* (2006.01)

(52) U.S. Cl.
CPC .... *H04M 1/72577* (2013.01); *G09G 2358/00* (2013.01); *H04M 1/667* (2013.01)

(58) Field of Classification Search
CPC ......... H04M 2250/12; H04M 1/72577; H04M 1/673; H04M 1/667; G06Q 30/0241; G09G 2358/00
See application file for complete search history.

(56) References Cited

U.S. PATENT DOCUMENTS

| | | | |
|---|---|---|---|
| 8,811,948 B2 | 8/2014 | Bandyopadhyay et al. | |
| 8,874,162 B2 | 10/2014 | Schrader et al. | |
| 8,910,299 B2 | 12/2014 | Michalske | |
| 8,982,077 B2 | 3/2015 | Chen et al. | |
| 9,104,288 B2 | 8/2015 | Wever et al. | |
| 2012/0084734 A1* | 4/2012 | Wilairat ................. | G06F 21/36 715/863 |
| 2012/0284673 A1 | 11/2012 | Lamb et al. | |
| 2013/0082974 A1 | 4/2013 | Kerr et al. | |
| 2013/0191911 A1 | 7/2013 | Dellinger et al. | |
| 2013/0283199 A1 | 10/2013 | Selig et al. | |
| 2014/0148218 A1 | 5/2014 | Lin | |
| 2014/0283142 A1 | 9/2014 | Shepherd et al. | |

FOREIGN PATENT DOCUMENTS

| | | |
|---|---|---|
| KR | 10-0993459 B1 | 11/2010 |
| KR | 10-2011-0016107 A | 2/2011 |
| KR | 10-1062117 B1 | 9/2011 |
| KR | 10-2011-0114873 A | 10/2011 |
| KR | 10-2012-0017157 A | 2/2012 |

OTHER PUBLICATIONS

Paul Morris, "How to Get the iOS 5.1 Camera Lock Screen on Your iPhone or iPod touch Running iOS 5.0.1", Redmond Pie, Mar. 28, 2012, http://www.redmondpie.com/how-to-get-the-ios-5.1-camera-lock-screen-on-your-iphone-or-ipod-touch-running-ios-5.0.1/.

* cited by examiner

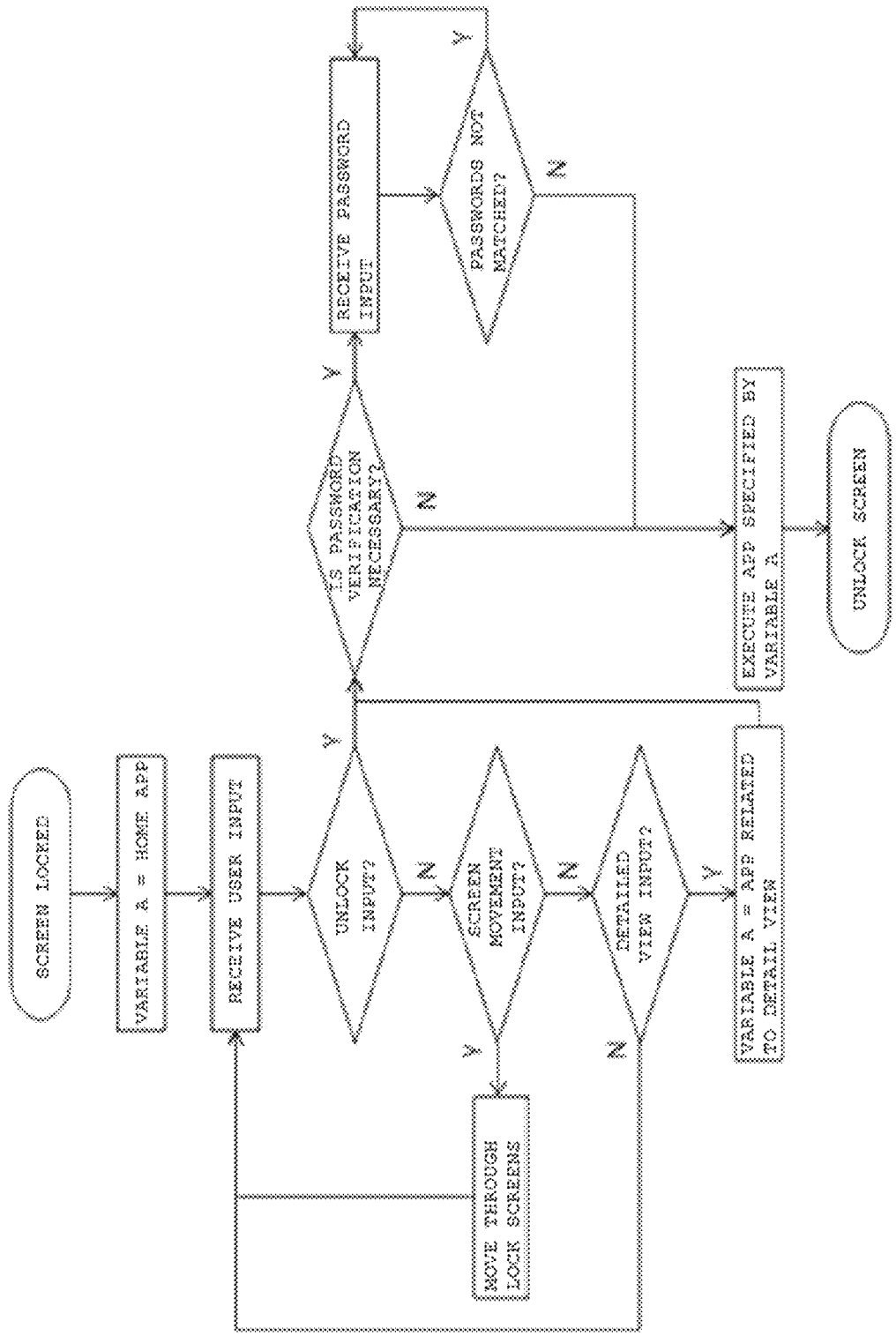

MOBILE COMPUTING TERMINAL WITH MORE THAN ONE LOCK SCREEN AND METHOD OF USING THE SAME

TECHNICAL FIELD

The present invention relates to the configuration and operation of a lock screen, and more particularly, to a lock screen providing method of displaying information or pieces of content using a plurality of lock screen windows, and a terminal device in which the method is implemented.

BACKGROUND ART

Mobile phones have become popular, in which smart phones having a touch screen applied thereto have become the mainstream. Smart phones use a lock screen to prevent "unintended execution of a function" that may occur when smartphones are in a pocket or bag. A user can unlock a locked screen by performing a specific input, for example, by flicking the screen or pressing an unlock button. After the locked screen is unlocked, the user can use a desired smart phone function. More particularly, the lock screen that is unlocked only when a password or specific pattern is input is used as a main means for protecting personal privacy.

DISCLOSURE

Technical Problem

The lock screen is useful against the unintended execution of a function or for the protection of privacy, but it is inconvenient for a user to unlock the lock screen every time when checking a simple form of information, such as weather or a calendar. More particularly, it is inconvenient to unlock the screen in order to check frequent notifications non-periodically generated, such as character message reception notifications, application (app) update notifications or message reception notifications of a mobile messenger.

In addition, a related-art lock screen having a single screen is not sufficient to express a user's personality. The function of displaying, on the lock screen, not one sheet of photograph but several sheets of photographs in a gallery of a cellular phone or displaying a matter of interest on the lock screen provides the user with a space for personal expression, and enables the user to create a personalized lock screen.

An aspect of the present invention is directed to provide a system and an operating method of a lock screen including a plurality of screens on which simple information can be easily recognized and which can be defined suitable for user taste, and to provide a method of exposing user-friendly advertisement on a system having the lock screen operating therein.

Hereinafter, for ease of description, the term "content" will be used as a comprehensive meaning including text information, images, music and moving pictures that can be displayed on a lock screen.

Technical Solution

The major operations of the present invention for realizing the foregoing objects are as follows.

According to an embodiment of the invention, provided is a method of providing a lock screen including a plurality of screens on a terminal device. The method includes the following steps of: (a) in response to a predetermined lock condition being sensed, transferring, at the terminal device, to a locked state and displaying a first lock screen; (b) in response to a predetermined first gesture being input while the first lock screen is being displayed, transferring to an unlocked state; and (c) in response to a predetermined second gesture being input while the first lock screen is being displayed, displaying a second lock screen different from the first lock screen.

The method may further include the steps of: receiving information about a piece of content to be displayed onto the first or second lock screen; receiving information about a specific area of the first or second lock screen in which the content is to be displayed; and mapping the specific area to the content so that the content is displayed in the specific area.

The method may further include the steps of: in order to display the first or second lock screen, detecting a source of the content from the information about the content; and receiving the content transmitted from the source of the content at every predetermined period or receiving the content transmitted from the source of the content when an alarm event for the content occurs, and updating a database of the terminal device.

The method may further include the step of: in order to provide detailed viewing of a piece of content disposed on the lock screen, executing a predetermined related application corresponding to the content, when coordinates of a start point of a user touch input that is input while the first or second lock screen is being displayed exist within the area in which the content is displayed and coordinates of an end point of the user touch input exist within a predetermined execution area displayed on the first or second lock screen window.

According to another embodiment of the present invention, the method may further include the steps of: adding a third lock screen including an advertisement display area in which a piece of advertisement content is displayed; receiving the advertisement content transmitted from an advertisement providing server; storing the transmitted advertisement content in the DB of the terminal device; and displaying the advertisement content in the advertisement display area.

The step of receiving the advertisement content transmitted from the advertisement providing server may include: extracting a core keyword by analyzing content displayed on the lock screen, and transmitting the core keyword to the advertisement providing server; and receiving the advertisement content transmitted from the advertisement providing server. The advertisement content is a customized content corresponding to the core keyword.

The method may further include, in response to a selection request for the advertisement content being input, loading a landing page of the advertisement content by driving a web browser. The method may further include calculating a number of times that the advertisement content is exposed or a number of times of movement to the advertisement landing page; and transmitting the calculated number of times to the advertisement providing server.

According to a further embodiment of the invention, provided is a terminal device including: a touch screen sensing a touch input by a user; one or more processors; and a memory storing a program executed by the one or more processors. When the program is executed by the one or more processors, the program causes the terminal device to perform the method as described above.

According to an embodiment of the invention, provided is a computer-readable recording medium in which a program for performing the method as described above.

Detailed features of other embodiments will be apparent from the detailed description and the accompanying drawings.

Advantageous Effects

According to the present invention, a lock screen of the related-art terminal device including a single screen can be including a plurality of screens, and thus all information that a user frequently identified can be displayed on a plurality of lock screens. Accordingly, a method is provided in which information that the user desires can be quickly identified without performing frequent unlocking.

Further, the user can directly set a piece of content to be displayed on a plurality of lock screens, and thus a lock screen personalized for each user can be configured. Accordingly, the user can reduce the access routine of a piece of content frequently read by the user, and the lock screen can be used as a personal display space in which the user's own personality exposes to another person.

Further, an advertisement can be displayed on some of a plurality of lock screens, and thus the lock screens can be act as a user-friendly advertisement platform. In addition, the lock screens can be act as a new content transmission medium such as a personalized electronic magazine using lock screen windows.

DESCRIPTION OF DRAWINGS

FIG. 9 is a flowchart illustrating the operation of a lock screen according to an embodiment of the present invention.

DETAILED DESCRIPTION OF EMBODIMENTS

Figure 1:
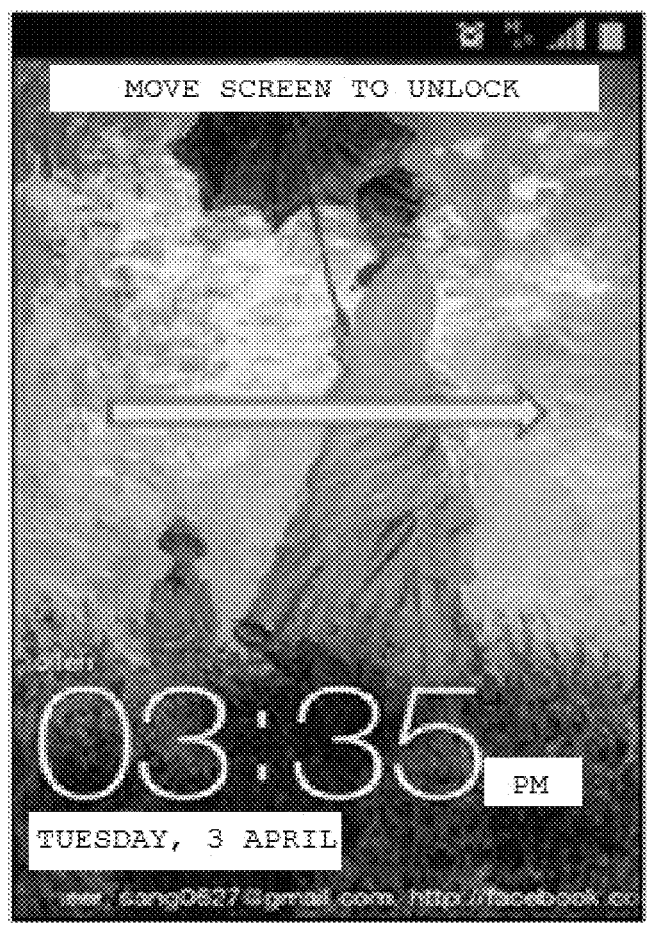
FIG. 1 illustrates an example of a screen in which a lock screen is set in a terminal device.

Exemplary embodiments of the present invention will be described below in detail with reference to the accompanying drawings since the present invention may have various changes in forms and have a variety of embodiments. It is to be understood, however, that the present description is not intended to limit the invention to those exemplary embodiments. On the contrary, the invention is intended to cover not only the exemplary embodiments, but also various alternatives, modifications, equivalents and other embodiments that may be included within the spirit and scope of the invention. In the following description of the present invention, detailed descriptions of known functions and components incorporated herein will be omitted in the case that the subject matter of the present invention is rendered unclear.

It will be understood that although the terms "first", "second", etc. are used herein to describe various elements, these elements should not be limited by these terms. These terms are only used to distinguish one element from another element.

The terms used in this application are used to only describe specific embodiments and are not intended to restrict the present invention. An expression of the singular number includes an expression of the plural number unless clearly defined otherwise in the context.

It will be further understood that the terms "comprise", "include," "have" and variations thereof, when used herein, specify the presence of stated features, integers, steps, operations, elements, components or combinations thereof, but do not preclude the presence or addition of one or more other features, integers, steps, operations, elements, components, or combinations thereof.

It will be understood that when an element transmits data to another element, it can directly transmit to the other element or at least one intervening element may be present. In contrast, when an element "directly transmits" data to another element, there are no intervening elements present.

Hereinafter, exemplary embodiments of the present invention able to specifically realizing the principle of a lock screen system including a plurality of screen windows will be described with reference to the accompanying drawings. The same reference numerals provided in each drawing denote the same components.

In general, a lock screen system for preventing the execution of an unintended function is included in a mobile terminal. FIG. 1 illustrates a related-art lock screen displayed when a mobile terminal is in the locked state, in which the mobile terminal is unlocked when a touch gesture displayed on the screen, the touch contact of which is movable in an arrow direction, is input.

As illustrated in FIG. 1, the related-art lock screen system may display an image set by a user or a basic background image on a lock screen. Unlike the related-art lock screen system including a single screen, when a plurality of lock screens is provided as proposed in the present invention, all pieces of content frequently checked by the user can be displayed on the plurality of lock screens regardless of the kind or number of the pieces of content. Thus, the content can be checked in a simplified manner, and various pieces of content can be used as means for expressing user's personality. Further, personalized and customized advertisements are exposed on some lock screens of the plurality of lock screens, so that the lock screens can serve as an advertisement platform that is more user-friendly than other types of lock screens on which only advertisements are exposed.

Entire Configuration of System

Figure 2:
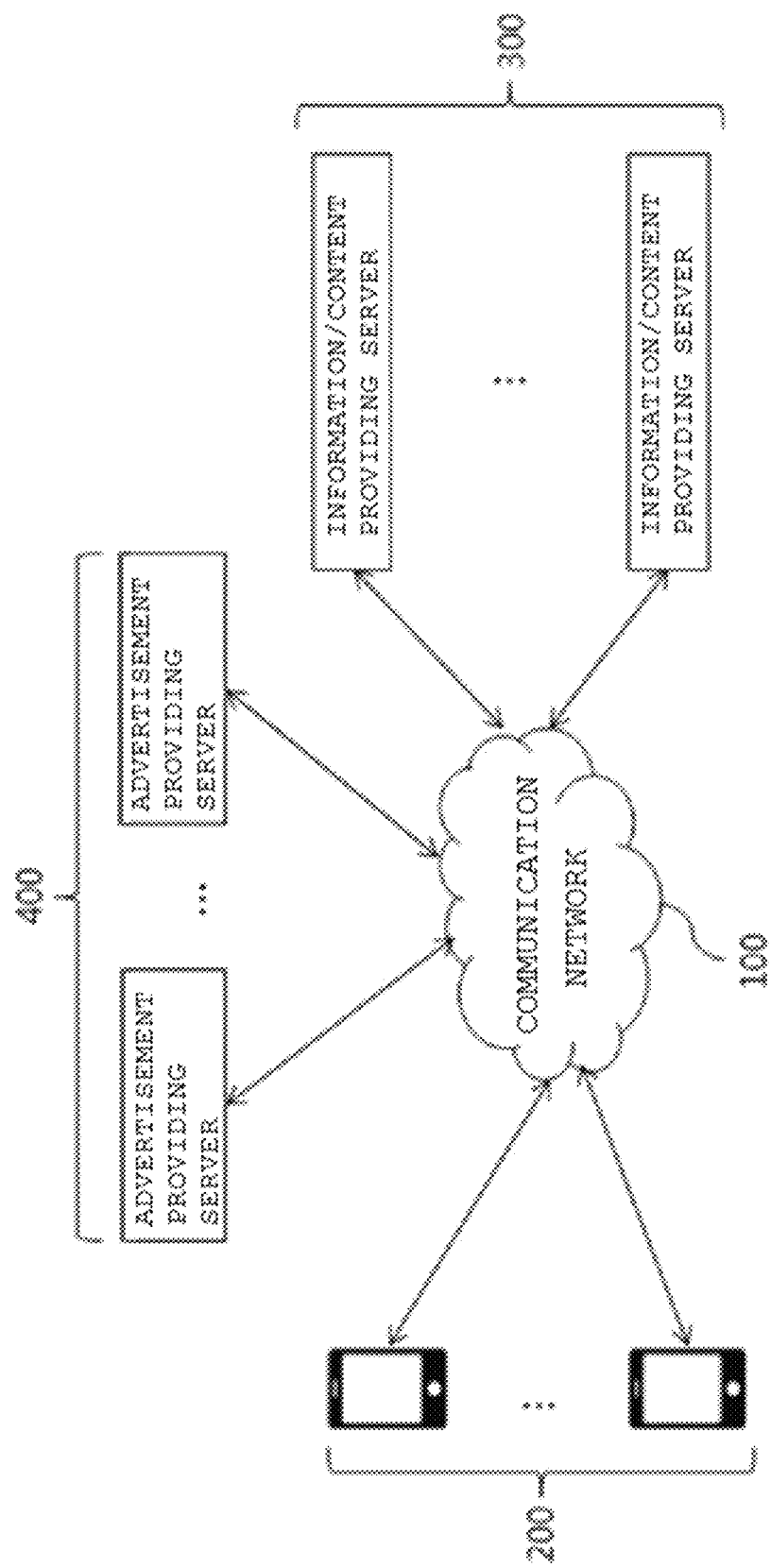
FIG. 2 schematically illustrates an entire system configuration for exposing pieces of content and advertisement on a plurality of lock screens according to an embodiment of the present invention.

FIG. 2 schematically illustrates an entire system configuration for displaying pieces of content to be set by a user on a plurality of lock screens according to an embodiment of the present invention.

As illustrated in FIG. 2, the lock screen system according to an embodiment of the present invention is connected to a communication network 100, terminal devices 200, content providing servers 300 and advertisement providing servers 400, to perform a method of providing a lock screen according to the technical spirit of the present invention.

The communication network 100 may be configured regardless of any type such as wire or wireless communication, and generally refers to all communication networks where data transmission is possible.

The terminal devices 200 generally refer to not only mobile terminals but also all devices to which a lock screen can be applied even if they are fixed devices such as PCs, TVs and LFDs.

The lock screen system according to an embodiment of the present invention may indicate a computer-readable program executed in the terminal device 200 or a kind of module including a memory in which the program is stored and/or a processor for executing the program. The lock screen system provides a method of displaying, on a plurality of lock screens, pieces of content stored in a local storage of the terminal device 200 or data transmitted through the communication network 100 from the content providing server 300 or the advertisement providing server 400, and performing an operation based on a user input value selected from among movement between lock screens, detailed viewing of pieces of content and unlocking.

Configuration of Terminal Device

Figure 3:
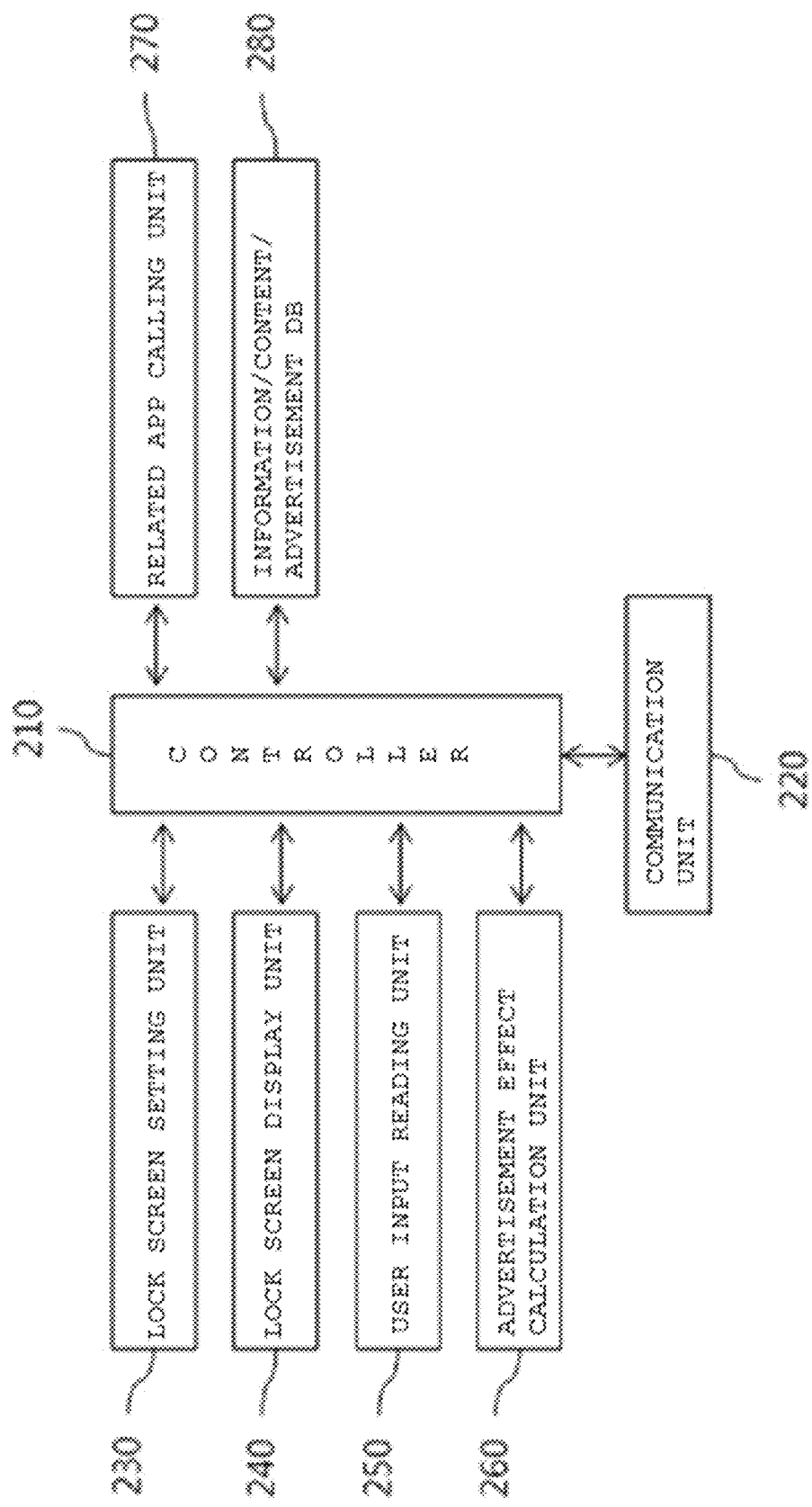
FIG. 3 illustrates the internal configuration of a lock screen system according to an embodiment of the present invention.

FIG. 3 illustrates the internal configuration of a lock screen system for providing a plurality of lock screens according to an embodiment of the present invention.

As illustrated in FIG. 3, the terminal device 200 includes a lock screen system including a controller 210, a communication unit 220, a lock screen setting unit 230, a lock screen display unit 240, a user input reading unit 250, an advertisement effect calculation unit 260, a related application (app) calling unit 270, and a content and/or advertisement content storage database (DB) 280.

The related application calling unit 270 may call not only basic applications installed in the terminal device but also all installed applications that a user downloaded from a predetermined applications providing server (e.g., Apple's App Store server, etc.).

The controller 210 updates the DB 280 of the terminal device with pieces of recent content periodically or when an alarm event occurs based on a basic setting value managed in the lock screen setting unit 230 or a user specified set value. A source for a piece of content or advertisement content necessary to be updated may be a local storage device of the terminal device, a program executed in the terminal device, or one of external servers connected through the communication unit 220. More particularly, the content or advertisement content of which source is an external server may be updated by being periodically transmitted from a rich site summary (RSS) feed that may be referred to as uniform resource locator (URL) or uniform resource identifier (URI), by being transmitted through periodic performance of requests and responses according to a web communication protocol (HTTP), or by being non-periodically transmitted through a push server connected to the content server or an alarm event system of the terminal device. As such, the source and updating method of a content or advertisement content required to update the DB 280 may be determined in a lock screen setting step to be described later.

The lock screen setting unit 230 receives information about a content to be displayed on a lock screen and receives information about a specific area on the lock screen, in which the content is to be displayed, to set mapping information about the content and the area. Meanwhile, the information about the content may include at least one of the source of the content, information required to execute an application related to the content, and the updating method and period of the content. The information about the specific area on the lock screen may include at least one of a screen recognition factor for specifying a specific lock screen among a plurality of lock screens, information about the position at which the area is disposed in the specific lock screen, the lateral and longitudinal sizes of the area, and a zoom level when the content is displayed in the area.

The lock screen display unit 240 reads a piece of content or advertisement content necessary for displaying a lock screen from the DB 280 of the terminal device and displays the read content on the lock screen according to a control command from the controller 210. In this state, the controller 210 can control the lock screen display unit 240 to display a preferred lock screen (e.g., a first lock screen) by adding a screen recognition factor, such as the number of a lock screen to be displayed on a display device of the terminal device among a plurality of lock screens, to the control command. When a user input is applied, the controller 210 may control the lock screen display unit 240 to display a second lock screen different from the first lock screen, to call the execution of an external application, or to release the locked state of the terminal device, based on a reading result of the user input reading unit 250.

The advertisement effect calculation unit 260 may calculate an advertisement effect such as the number of times that a specific advertisement is exposed on a plurality of lock screens, the number of times that detailed viewing of the advertisement is performed, or the number of times that a landing page of the advertisement is loaded, according to the control command from the controller 210, and transmit the calculated advertisement effect to the advertisement providing server 400 through the communication unit 220.

Lock Screen Setting Method

Figure 4:
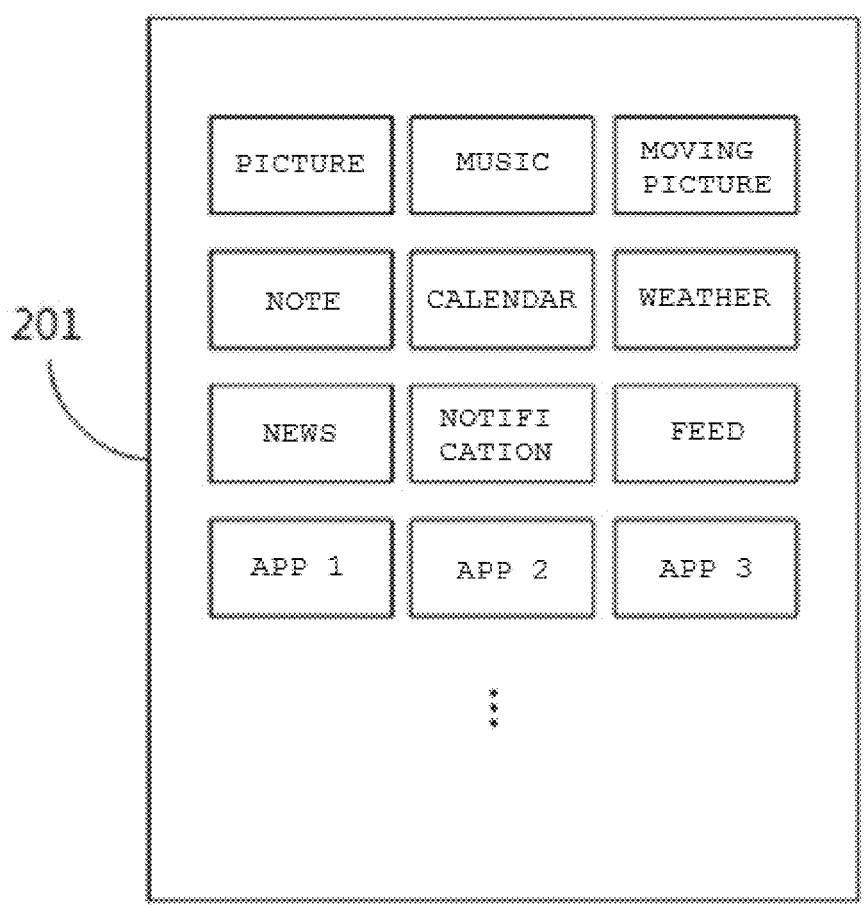
FIG. 4 illustrates a screen on which predetermined pieces of content are set on the lock screen according to an embodiment of the present invention.

FIG. 4 illustrates an example screen on which a plurality of lock screens are set according to an embodiment of the present invention.

Figure 5A:
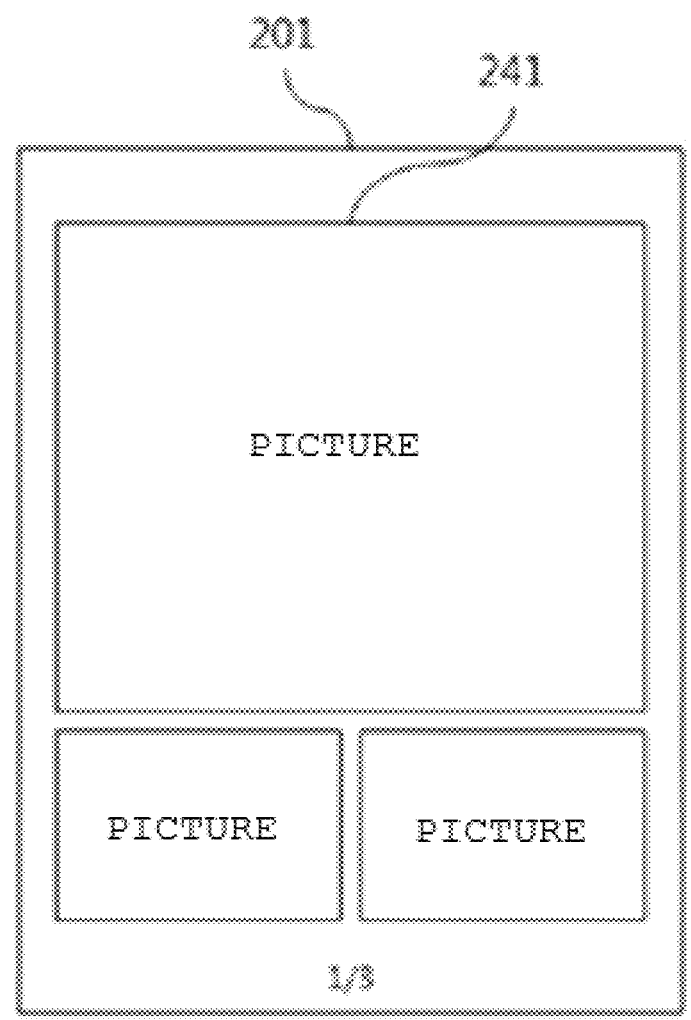
FIGS. 5A, 5B and 5C illustrate screen views relating to a method of disposing a piece of content selected from the lock screen setting window of FIG. 4 on a lock screen according to an embodiment of the present invention.
Figure 5B:
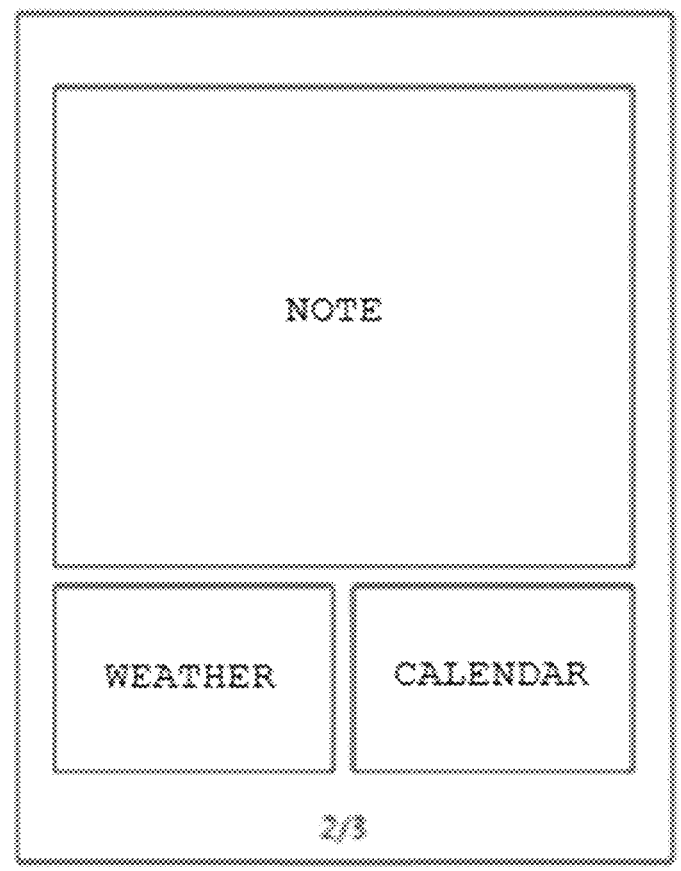
Figure 5C:
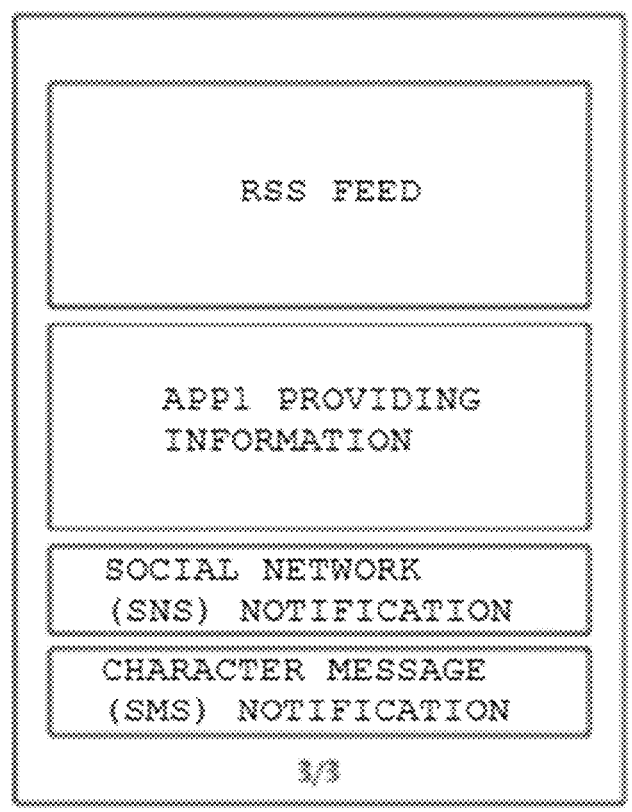

According to an embodiment of the present invention, when a user enters into a lock screen setting step, selectable pieces of content are displayed on a screen 201 of the terminal device, as illustrated in FIG. 4. When the user selects a specific piece of content, the lock screen setting step is transferred to a content display area setting step for determining the screen layout of lock screens as illustrated in FIG. 5. If a specific item of the selected content is to be additionally selected, a specific item selection step may be further provided prior to the transfer to the content display area setting step. For example, when a picture item in FIG. 4 is selected, a step of selecting a specific picture from a gallery of the terminal device 200 is first performed, and the content selection step is then transferred to a step of setting an area in which the selected picture is to be displayed.

Meanwhile, the content selection step may further include a step of determining a source of the content and an updating period of the content. The source of the content may be a local storage device of the terminal device, such as a picture gallery, a program executed in the terminal device, such as an event notification system, or one of external servers connected through the communication unit 220, such as a web service. The selected content may be updated periodically or non-periodically, and the lock screen system may refer to the source of the content in order to update the content. The periodic content updating method may be provided in real time, in a time period determined in the form of {second/minute/hour/day/date/month/year}, or in an infinite updating period. If the step of selecting the source of the content or the step of setting the updating method and period of the content is omitted, the source or period of the content may be determined as a default value provided by the lock screen system.

FIG. 5 illustrates an example in which predetermined ten pieces of content are disposed over three pages. In the content display area setting step, the user may select one of areas 241 in which the ten pieces of content are displayed as a display area of the content. That is, the selected content may be set to substitute for a piece of content that has been previously displayed in one of the areas in which the ten pieces of content are displayed. In addition, a new page may be added while all of the ten pieces of content illustrated in FIG. 5 are maintained, and the area 241 in which the selected content is to be displayed may be set on the added page. In such a manner, the user can add a new page on a lock screen or delete an existing page. Thus, as illustrated in the example of FIG. 5, various types of content can be freely set on a lock screen including one or more pages.

According to another embodiment of the present invention, in the setting step of FIG. 5, the user may select the display area 241 of the content, set on the lock screen, as a specific display area in a default layout provided from the lock screen system, and the position or size of the display area of the content may be arbitrarily adjusted. First, as an embodiment of the former, when a new page is added to the lock screen, the user may select one of predetermined layout forms, and an area in which the content is to be displayed may be selected in the selected layout form. The predetermined layout form may be a form such as the second or third page of FIG. 5, an empty page with no specific form, or any layout different from the forms described above. Meanwhile, as an embodiment of the latter, the user may input a touch onto an empty area of the lock screen and then drag the touch up to a specific point, thereby setting a quadrangular display area having a diagonal from the initial touch start point to the last touch end point. The quadrangular display area may be used as an area in which the selected content is displayed. More particularly, the empty area may be provided by adding an empty page having no specific form or by selectively deleting a specific display area from the existing layout.

According to an embodiment of the present invention, the information obtained by mapping the selected content to the set display area can be managed by the lock screen system, and may be referred in order to display a specific piece of content in a specific screen area in a method of displaying a lock screen, which will be described later.

Lock Screen Display Method

According to an embodiment of the present invention, when the terminal device 200 senses a predetermined lock condition, the state of the terminal device 200 is transferred to a locked state, and a first lock screen may be displayed. For example, when any input is not applied from a user for a predetermined period or more, when a predetermined power button provided in the terminal device 200 is pressed by the user in a state in which the terminal device 200 is turned on to turn off a screen, or when a predetermined lock button provided in the terminal device 200 is pressed, the terminal device 200 may sense this as the predetermined lock condition. In the locked state, the terminal device 200 may display the first lock screen. As described later, the terminal device 200 may not react with another input except an unlocking gesture, a gesture for transfer to a second lock screen or a gesture for detailed viewing of content. As described above, a predetermined content may be displayed on the first lock screen by the user.

Meanwhile, when a predetermined first gesture is input while the first lock screen is being displayed, the state of the terminal device 200 may be transferred to an unlocked state. Here, the unlocked state may indicate a state in which a lock for preventing the execution of a function of the terminal device 200 due to a user's unintended input or protecting privacy is released so that functions provided by the terminal device 200 can be completely used. The first gesture for unlocking will be described in detail later in an "unlocking method" that will be described later.

When the state of the terminal device 200 is transferred to a screen locked state, the content that the user sets through the lock screen setting process of FIG. 5 is displayed as the first lock screen in the display device of the terminal device 200. According to an ordinary method, when a plurality of lock screens are initially driven, a first lock screen among the plurality of lock screens may be displayed, and from this time, a lock screen finally displayed in a previous lock condition state may be displayed. That is, when a predetermined second gesture is input while the first lock screen is being displayed, the terminal device 200 may display a second lock screen different from the first lock screen. When the second gesture is again input while the second lock screen is being displayed, the terminal device 200 may display a third lock screen different from either the first lock screen or the second lock screen. When the first gesture described above is input on the third lock screen, the state of the terminal device 200 may be transferred to the unlocked state. When a predetermined locked state is sensed after that time, the state of the terminal device 200 is transferred to the locked state, and the third lock screen displayed just before the state of the terminal device 200 is transferred to the unlocked state is displayed in the display device of the terminal device 200. The second gesture for moving through the lock screens will be described in detail in "method of navigating through lock screens" to be described later.

Meanwhile, when the amount of content displayed on each lock screen is large, the corresponding content may be continuously added in the display area specified in FIG. 5 and then scrolled in the display area, only a piece of summarized content may be displayed in the display area, or a piece of content reduced at a predetermined display magnification may be displayed in the display area. The screen display method may be determined in the initial setting provided in the present invention.

Figure 7:
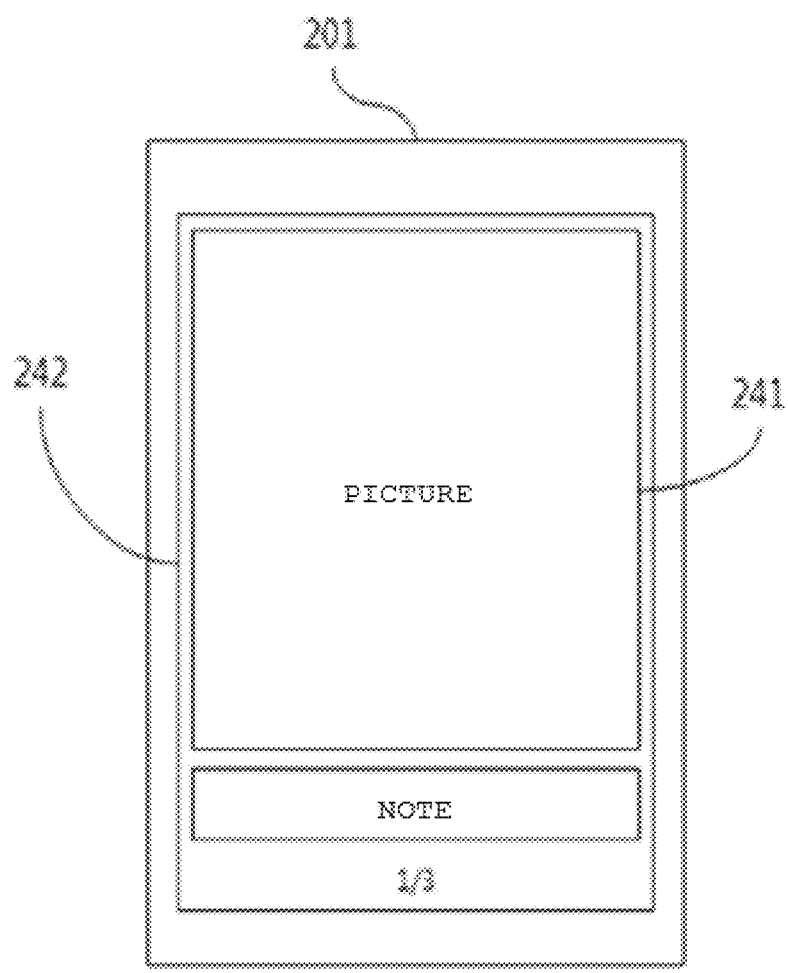
FIG. 7 illustrates a method of displaying a virtual electronic book on a lock screen having a single screen, in which pieces of content are displayed on the virtual electronic book, according to an embodiment of the present invention.

According to another embodiment of the present invention, a method may be provided in which a virtual object is set in a screen, and a plurality of screens are displayed in the object, without displaying each lock screens on the entire screen of the terminal device. As an embodiment of the method of displaying lock screens using the virtual object, a virtual electronic book may be displayed, as illustrated in FIG. 7. Individual pages of the electronic book may be matched one by one to lock screens, thereby substituting for a plurality of lock screens. In this embodiment, when a lock screen is moved, the entire display of the terminal device is not changed, but only a virtual individual page defined in the virtual object may be changed and displayed.

Lock Screen Navigation Method

According to an embodiment of the present invention, movement between a plurality of lock screens in a lock screen system may be provided using a method of detecting a user input and moving, based on the detected input, a current lock screen to a next lock screen, a previous lock screen, or a lock screen that a lock screen identifier indicates. For example, when a user touch gesture such as a screen flick that moves in a predetermined direction in the state in which a touch contact point is maintained, a current screen may be moved to a next screen (left direction flick) or a previous screen (right direction flick). The screen moving method is not limited to the touch gesture such as the screen flick, and may be provided in various forms including a method of selecting a specific icon or button defined for the purpose of screen movement, a touch gesture for drawing a numeral corresponding to a screen number on a touch screen, and the like.

According to another embodiment of the present invention, a method of setting a virtual object in a lock screen and moving a plurality of screens in the object may be provided as illustrated in FIG. 7. As an example, movement of a plurality of lock screens may be provided using a method of displaying a virtual electronic book on the lock screen and turning pages of the electronic book. The movement between pages of the virtual electronic book may be provided in various forms, using various input means such as a page flick, a specific icon or button, a specific gesture, and the like. As another example in which the virtual object is used in the method of providing a lock screen including a plurality of screens, movement through a plurality of lock screens may be provided using a method of displaying a virtual three-dimensional cube and rotating the display direction of the cube.

Content Detailed View Providing Method

A lock screen is to prevent an unintended touch input in terms of its unique object, it is not preferable to use the related-art method of performing a simple touch selection input in order to provide a detailed view function for a piece of content displayed on a lock screen. This is because when the related-art method is applied to the lock screen, there frequently occurs a case where an application related to the content is executed regardless of a user's intention.

According to an embodiment of the present invention, when a piece of content displayed on a lock screen is selected, a method of executing an application related to the content is provided in order to provide a piece of content that is more detailed than the displayed content. For example, when a detailed view of the selected content is executed by selecting a piece of content displayed on a lock screen, e.g. today's weather, a weather application is called to provide detailed information such as a forecast for each hour or week at the moment that the screen is unlocked.

Figure 6:
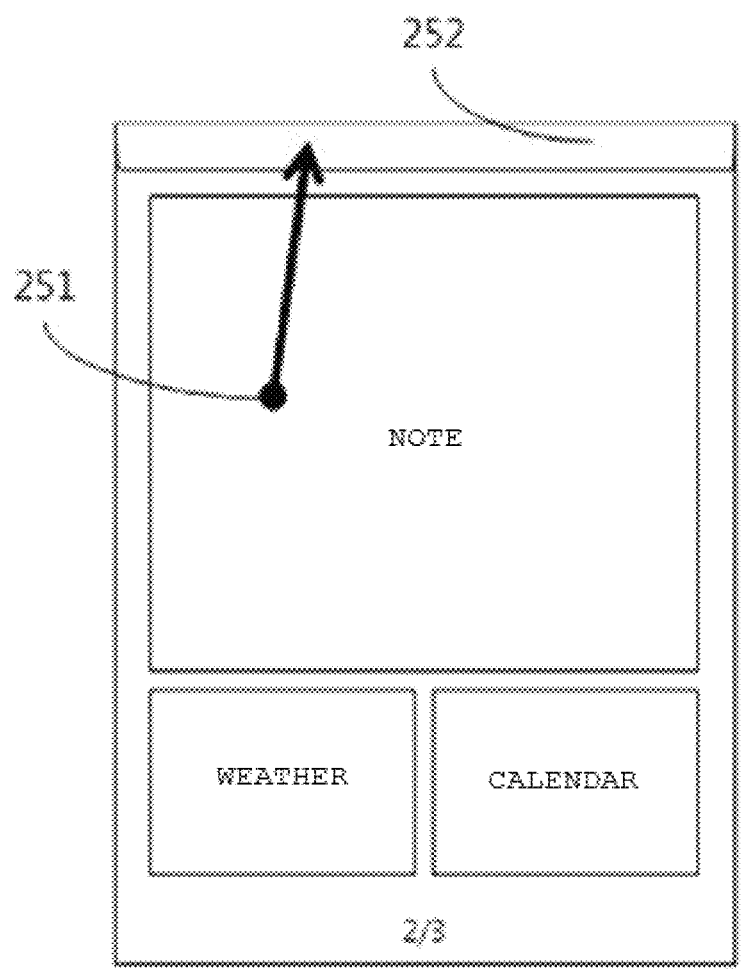
FIG. 6 illustrates a method of performing detailed viewing of a piece of content mapped to a user selected area on a lock screen according to an embodiment of the present invention.

To this end, FIG. 6 illustrates a method of calling an application related to a piece of content by dragging the content displayed on a lock screen according to an embodiment of the present invention. In order to select and request an object on which a user desires to perform a detailed view, the user performs dragging an interest content display area from an input start point 251 to a related application execution area 252. The lock screen system, as illustrated in FIG. 3, provides a method of detecting the existing external application execution command from the user input reading unit 250, identifying a piece of content corresponding to the coordinates of the start point, and subsequently calling an external application for providing the content. Meanwhile, the application execution area 252 is not necessarily limited to an upper end of the lock screen, and may be disposed at any position on the lock screen. For helping intuitive understanding, the application execution area may be displayed using a preferred descriptive phrase or icon.

Unlocking Method

Figure 8A:
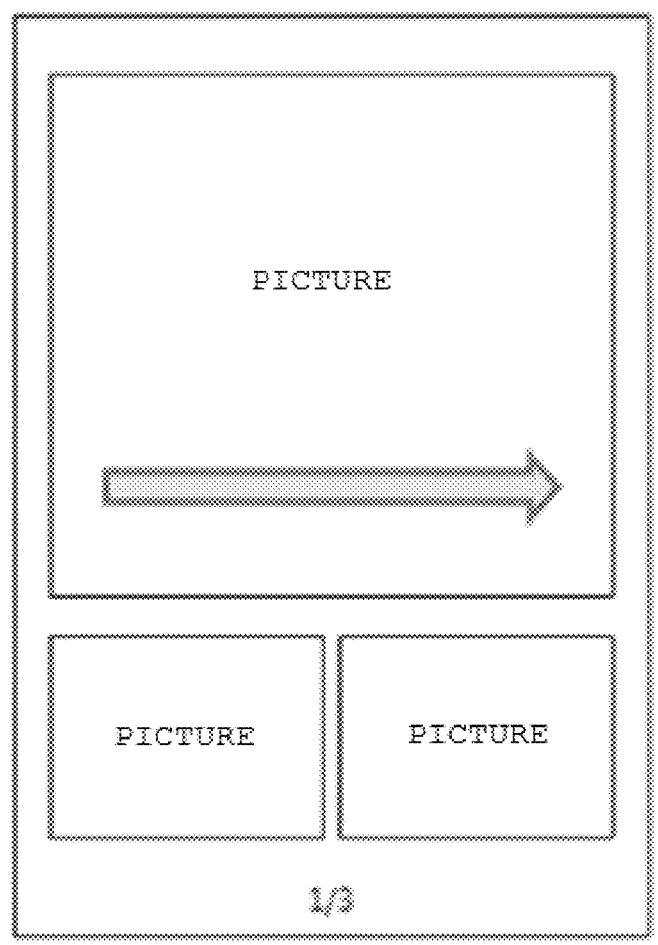
FIGS. 8A and 8B illustrate touch screen gestures relating to a method of determining screen movement and unlocking on a lock screen including a plurality of screens according to an embodiment of the present invention.
Figure 8B:
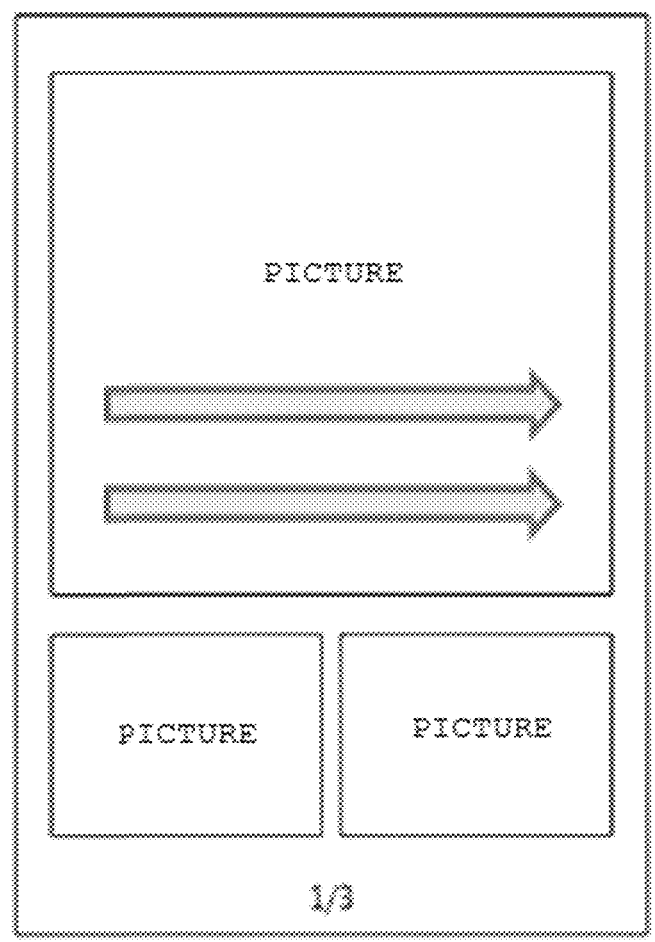

FIG. 8 illustrates an example in which a lock screen movement input and a unlocking input are determined depending on the number of touch contact points on a lock screen including a plurality of screens. According to an embodiment of the present invention, as illustrated in FIG. 8, a method may be provided in which a first gesture for touching and flicking with two fingers is recognized as an unlocking command, and a second gesture for touching and flicking with one finger is recognized as a lock screen navigation command. In this state, the first and second gestures may be provided as other predetermined gestures as long as they are different motions that can be distinguished from each other. For example, the first gesture for unlocking may be provided as a gesture for performing unlocking when a long touch is applied to the lock screen, and the second gesture for screen navigation may be provided as a gesture for touching and flicking with three fingers.

Meanwhile, according to another embodiment of the present invention, as illustrated in FIG. 9, a method may be provided in which, if the first gesture for unlocking is input when the terminal device is set so that the screen is unlocked only when predetermined information such as a password or movement pattern of a touch contact point is input, a password or a touch pattern is input by a user, and the screen is unlocked only when the verification result of the password or touch pattern input by the user corresponds to a predetermined password or touch pattern.

Advertisement Exposure Method

According to an embodiment of the present invention, a method may be provided in which, when the terminal device is in the locked state, a piece of advertisement content transmitted from the advertisement providing server 400 is displayed on some of a plurality of lock screens. For example, in a state in which a lock screen including three pages is set as illustrated in FIG. 5, the lock screen system may automatically add a fourth page as a screen for advertisement exposure, and display the advertisement content transmitted from the advertisement providing server 400.

According to another embodiment of the present invention, a preferred advertisement keyword may be extracted by analyzing a piece of content registered in the lock screen set by a user, and a user customized advertisement may be received as a response by transmitting, to the advertisement providing server 400, an advertisement request using the advertisement keyword as a factor, to be exposed on a portion of the lock screen for advertisement exposure. User's personal information is not transmitted to the advertisement providing server, and only a keyword for advertisement search, extracted from a piece of content set in the lock screen, is transmitted to the advertisement providing server. Thus, the advertisement request and response method is a preferred method that can prevent the infringement of personal privacy and display a customized advertisement.

Meanwhile, the user may request an advertisement detailed view on an advertisement exposure screen using a method similar to that illustrated in FIG. 6. In this state, the lock screen system may move to a landing page of advertisement by executing a related application such as a web browser using the same method as in the detailed view request processing. The number of times that the advertisement is exposed and the number of times that the advertisement landing page is loaded may be calculated through the advertisement effect calculation unit 260, and the calculated advertisement effect may be transmitted to the advertisement providing server 400 through the communication unit 220.

Flow Control Method of Lock Screen

FIG. 9 illustrates, as an embodiment of the present invention, a flow control method of a lock screen, which performs the lock screen display method, the lock screen navigation method, the content detailed view method and the unlocking method by receiving a user input when the terminal device 200 has transferred to the locked state by sensing a predetermined lock condition. A user may input a first gesture for unlocking, a second gesture for navigating a plurality of lock screens, and a third gesture for viewing in detail a specific piece of content. The first, second and third gestures may be provided as different gestures that can be determined by the user input reading unit 250.

First, when the determination result of the received user input is the first gesture for unlocking, the lock screen providing method of the present invention may check whether a predetermined password or touch pattern exists before unlocking the terminal device. If the predetermined password or touch pattern exists, a password or touch pattern is input. The state of the terminal device is transferred to the unlocked state only when the input password or touch pattern corresponds to the predetermined password or touch pattern. When the input password or touch pattern does not correspond to the predetermined password or touch pattern, a password or touch pattern may be input again. According to another embodiment of the present invention, when the step of receiving the first gesture and verifying the password is performed, the terminal device may execute a home application thereof while transferring to the unlocked state.

Meanwhile, when the second gesture for lock screen movement is input in a state in which a first lock screen that is one of a plurality of lock screens is being displayed on the display device of the terminal device, the lock screen providing method may display a second lock screen different from the first lock screen on the display device of the terminal device. The second lock screen may be determined based on a reading result of the second gesture among the plurality of lock screens as described in the lock screen navigation method.

When the determination result of the received user input is the third gesture for content detailed view, the lock screen providing method of the present invention may check whether a predetermined password or touch pattern exists before a content detailed view is provided. If the predetermined password or touch pattern exists, a password or touch pattern is input. The state of the terminal device is transferred to the unlocked state only when the input password or touch pattern corresponds to the predetermined password or touch pattern. When the input password or touch pattern does not correspond to the predetermined password or touch pattern, a password or touch pattern may be input again. According to another embodiment of the present invention, when the step of receiving the third gesture and verifying the password is performed, the terminal device may execute an application related to the content to provide the content detailed view as the state of the terminal device is transferred to the unlocked state.

As described above, the method of the present invention may be implemented in the form of computer-readable program commands to be stored in a computer-readable recording medium. The computer-readable recording medium includes all kinds of recording devices where data readable by a computer system are stored.

The program commands recoded in the media may be particularly designed and configured for the present invention or may be well known to those skilled in the art related to computer software.

Examples of the computer-readable recording medium include hardware devices, particularly configured to store and perform program commands, such as, magnetic media, such as a hard disk, a floppy disk, and a magnetic tape; optical media, such as a compact disk-read only memory (CD-ROM) and a digital versatile disc (DVD); magneto-optical media, such as floptical disks; a read-only memory (ROM); a random access memory (RAM); and a flash memory. The medium may be a transmission medium, such as an optical or metal line and a waveguide, including carriers for transmitting a signal to designate a program command, a data structure, or the like. In addition, the computer-readable recording medium is distributed in a computer system connected via a network so that computer-readable codes can be stored and executed in a distributed manner.

Examples of the program commands include not only machine languages generated by compilers, but also high-level languages that may be carried out by a computer via an interpreter or Java bytecode.

The hardware device described above may be constructed so as to operate as one or more software modules for performing the operations of the embodiments of the present invention, and vice versa.

While the present invention has been illustrated and described with reference to the certain exemplary embodiments thereof, it will be understood by those skilled in the art that various changes in form and details may be made therein without departing from the spirit and scope of the invention as defined by the appended claims. Therefore, the foregoing embodiments should be understood as being illustrative but not limitative purposes. For example, some parts described as being located in a single physical entity can be implemented as being distributed to a plurality of physical devices. In the same fashion, some parts described as being distributed to a plurality of physical devices can be located in a single physical entity.

The scope of the invention is defined not by the detailed description of the invention but by the appended claims, and all differences within the scope will be construed as being included in the present invention.

The invention claimed is:

1. A computer-implemental method of operating a computing device comprising a touch screen display, the method comprising:

displaying a first lock screen pane of plural lock screen panes in a lock screen user interface when the computing device is locked in accordance with a predetermined lock condition;

receiving a user input comprising one or more touch gestures on the touch screen display or a button of the computing device while the first lock screen pane is displayed on the touch screen dislay;

in response to an input of a first acceptable touch gesture at the first lock screen pane, causing the touch screen, display to transition, from the first lock screen pane to an unlock prompt screen configured to receive a code or pattern predetermined to unlock the computing device;

wherein the computing device is configured to transition from the unlock prompt screen to an unlock screen configured to permit a user to access the entire features available on the computing device in response to an input of the predetermined code or pattern on the unlock prompt screen;

in response to an input of a second acceptable touch gesture at the first lock screen pane, causing the touch screen display to transition from the first lock screen pane to a second lock screen pane of plural lock screen panes without an intervening screen for inputting the predetermined code or pattern from the touch screen display;

receiving a user input comprising one or more gestures on the touch screen display or the button of the computing device while the second lock screen pane is diplayed on the touch screen display; and subsequently, in response to an input of the first acceptable touch gesture at the second lock screen pane, causing the touch screen display to transition from the second lock screen pane to the unlock prompt screen.

2. The method of claim 1, wherein each of the plural lock screen panes comprises at least one application icon or widget, wherein a widget is an area displaying a content provided by a corresponding content source selected from the group consisting of photography, motion picture, music, calendar, news, memo, weather, advertisement, information feed, notification, SNS, URL, and configuration of the computing device.

3. The method of claim 2, wherein the device is configured to allow a user to configure one or more lock screen panes of the plural lock screen panes such that the at least one application icon or widget is placed at a specific location on the one or more lock screen panes that the user designates.

4. The method of claim 1, further comprising:
in response to an input of a second acceptable touch gesture at the second lock screen pane, causing the touch screen display to transition from the second lock screen pane to a third lock screen pane of plural lock screen panes or the previously displayed first lock screen pane in accordance with a property of the second acceptable touch gesture without an intervening screen for inputting the predetermined code or pattern from the touch screen display;

receiving a user input comprising one or more gestures on the touch screen display or the button of the computing device while the third lock screen pane is displayed on the touch screen display; and subsequently, in response to an input of the first acceptable touch gesture at the third lock screen pane, causing the touch screen display to transition from the third lock screen pane to the unlock prompt screen.

5. The method of claim 1, further comprising:
displaying each of the plural lock screen panes in, consecutive order while navigating throughout the plural lock screen panes in accordance with the second acceptable touch gestures inputted consecutively without an intervening screen for inputting the predetermined code or pattern from the touch screen display;

wherein the property of each second acceptable touch gesture determines a direction of each navigation step throughout the plural lock screen panes;

wherein the first acceptable touch gesture inputted on any lock screen pane causes the touch screen display to transition from the lock screen pane of the plural lock screen panes to the unlock prompt screen.

6. The method of claim 1, wherein each of the plural lock screen panes does not comprise a user interface for inputting the predetermined code or pattern for unlocking the device.

7. The method of claim 1, wherein the first lock screen pane is a default lock screen pane of the plural lock screen panes, a last lock screen pane displayed just before transitioning to the unlock prompt screen, or a last lock screen pane displayed just before turning off the touch screen display in the locked state.

8. The method of claim 2, further comprising:
receiving a user touch input on the at least one application icon or widget appearing on a lock screen pane for activating at least one feature corresponding to the at least one application icon or widget received the user touch input;

in response to the user touch input on the at least one application icon or widget, causing the touch screen display to transition from, the lock screen pane to the unlock prompt screen prior to activate the at least one feature.

9. The method of claim 8, further comprising:
in response to an input of the predetermined code or pattern on the unlock prompt screen, causing the touch screen display to transition from the unlock prompt screen to the unlock screen and activating the at least one feature.

10. A computing device comprising:
one or more processors;
a touch screen display;
one or more buttons; and
one or more computer readable memory having stored therein computer-executable instructions that, when executed by the one or more processors, performs a method comprising;

displaying a first lock screen pane of plural lock, screen panes in a lock screen user interface when the computing device is locked in accordance with a predetermined lock condition;

receiving a user input comprising one or more touch gestures on the touch screen display or a button of the computing device while the first lock screen pane is displayed on the touch screen display;

in response to an input of a first acceptable touch gesture at the first lock screen pane, causing the touch screen display to transition from the first lock screen pane to an unlock prompt screen configured to receive a code or pattern predetermined to unlock the computing device;

wherein the computing device is configured to transition from the unlock prompt screen to an unlock screen configured to permit a user to access the entire features available on the computing device in response to an input of the predetermined code or pattern on the unlock prompt screen;

in response to an input of a second acceptable touch gesture at the first lock screen pane, causing the touch screen display to transition from the first lock screen pane to a second lock screen pane of plural lock screen panes without an intervening screen for inputting the predetermined code or pattern from the touch screen display;

receiving a user input comprising one or more gestures on the touch screen display or the button of the computing device while the second lock screen pane is display on the touch screen display; and subsequently, in response to an input of the first acceptable touch gesture at the second lock screen pane, causing the touch screen display to transition from the second lock screen pane to the unlock prompt screen.

11. The computing device of claim 10, wherein each of the plural lock screen panes comprises at least one application icon or widget, wherein a widget is an area displaying a content provided by a corresponding content source selected from the group consisting of photography, motion picture, music, calendar, news, memo, weather, advertisement, information feed, notification, SNS, URL, and configuration of the computing device.

12. The computing device of claim 11, wherein the device is configured to allow a user to configure one or more lock screen panes of the plural lock screen panes such that the at least one application icon or widget is placed at a specific location on the one or more lock screen panes that the user designates.

13. The computing device of claim 10, wherein the method further comprises:
   in response to an input of a second acceptable touch gesture at the second lock screen pane, causing the touch screen display to transition from the second lock screen pane to a third lock screen pane of plural lock screen panes or the previously displayed first lock screen pane in accordance with a property of the second acceptable touch gesture without an intervening screen for inputting the predetermined code or pattern from the touch screen display;
   receiving a user input comprising one or more gestures on the touch screen display or the button of the computing device while the third lock screen pane is displayed on the touch screen display; and
   subsequently, in response to an input of the first acceptable touch gesture at the third lock screen pane, causing the touch screen display to transition from the third lock screen pane to the unlock prompt screen.

14. The computing device of claim 13, wherein the method further comprises:
   displaying each of the plural lock screen panes in consecutive order while navigating throughout the plural lock screen panes in accordance with the second acceptable touch gestures inputted consecutively without an intervening screen for inputting the predetermined code or pattern from the touch screen display;
   wherein the property of each second acceptable touch gesture determines a direction of each navigation step throughout the plural lock screen panes;
   wherein the first acceptable touch, gesture inputted on any lock, screen pane causes the touch screen display to transition from the lock screen pane of the plural lock screen panes to the unlock prompt screen.

15. One or more non-transitory computer-readable memory or storage devices storing computer-executable instructions that, when executed by a computing device, perform a method, the method comprising:
   displaying a first lock screen pane of plural lock screen panes in a lock screen user interface when the computing device is locked in accordance with a predetermined lock condition;
   receiving a user input comprising one or more touch gestures on the touch screen display or a button of the computing device while the first lock screen pane is displayed on the touch, screen display;
   in response to an input of a first acceptable touch gesture at the first lock screen pane, causing the touch screen display to transition from the first lock screen pane to an unlock prompt screen configured to receive a code or pattern predetermined to unlock the computing device;
   wherein the computing device is configured to transition from the unlock prompt screen to an unlock screen configured to permit a user to access the entire features available on the computing device in response to an input of the predetermined code or pattern on the unlock prompt screen;
   in response to an input of a second acceptable touch gesture at the first lock screen pane, causing the touch screen display to transition from the first lock screen pane to a second lock screen pane of plural lock screen panes without an intervening screen for inputting the predetermined code or pattern from the touch screen display;
   receiving a user input comprising one or more gestures on the touch screen display or the button of the computing device while the second lock screen pane is displayed on the touch screen display; and
   subsequently, in response to an input of the first acceptable touch gesture at the second lock screen pane, causing the touch screen display to transition from the second lock screen pane to the unlock prompt screen.

16. The non-transitory computer-readable memory or storage devices of claim 15, wherein each of the plural lock screen panes comprises at least one application icon or widget, wherein a widget is an area displaying a content provided by a corresponding content source selected from the group consisting of photography, motion picture, music, calendar, news, memo, weather, advertisement, information feed, notification, SNS, URL, and configuration of the computing device.

17. The non-transitory computer-readable memory or storage devices of claim 16, wherein the device is configured to allow a user to configure one or more lock screen panes of the plural lock screen panes such that the at least one application icon or widget is placed at a specific location on the one or more lock screen panes that the user designates.

18. The non-transitory computer-readable memory or storage devices of claim 15, wherein the method further comprises:
   in response to an input of a second acceptable touch gesture at the second lock screen pane, causing the touch screen display to transition from the second lock screen pane to a third lock screen pane of the plural lock screen panes or the previously displayed first lock screen pane in accordance with a property of the second acceptable touch gesture without an intervening screen for inputting the predetermined code or pattern from the touch screen display;
   receiving a user input comprising one or more gestures on the touch screen display or the button of the computing device while the third lock screen pane is displayed on the touch screen; and
   subsequently, in response to an input of the first acceptance touch gesture at the third lock screen pane, causing the touch screen display to transition from the third lock screen pane to the unlock prompt screen.

19. The non-transitory computer-readable memory or storage devices of claim 18, wherein the method further comprises:
   displaying each of the plural lock screen panes in consecutive order while navigating throughout the plural lock screen panes in accordance with the second acceptable touch gestures inputted consecutively without an intervening screen for inputting the predetermined code or pattern from the touch screen display;

wherein the property of each second acceptable touch gesture determines a direction of each navigation step throughout the plural lock screen panes;

wherein the first acceptable touch gesture inputted on any lock screen pane causes the touch screen display to transition from the lock screen pane of the plural lock screen panes to the unlock prompt screen.

\* \* \* \* \*